US012411685B2

(12) United States Patent
Hahn et al.

(10) Patent No.: US 12,411,685 B2
(45) Date of Patent: Sep. 9, 2025

(54) COMPUTER-IMPLEMENTED METHOD FOR VERIFYING A PLURALITY OF COMMITS

(71) Applicant: Siemens Aktiengesellschaft, Munich (DE)

(72) Inventors: Christian Hahn, Höchstadt a.d. Aisch (DE); Anja Hentschel, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 134 days.

(21) Appl. No.: 18/104,322

(22) Filed: Feb. 1, 2023

(65) Prior Publication Data

US 2023/0259362 A1 Aug. 17, 2023

(30) Foreign Application Priority Data

Feb. 14, 2022 (EP) .................................... 22156541

(51) Int. Cl.
*G06F 11/3604* (2025.01)
*G06F 8/71* (2018.01)
*G06F 8/77* (2018.01)
*G06F 11/362* (2025.01)

(52) U.S. Cl.
CPC .................. *G06F 8/77* (2013.01); *G06F 8/71* (2013.01); *G06F 11/3616* (2013.01); *G06F 11/362* (2013.01)

(58) Field of Classification Search
None
See application file for complete search history.

(56) References Cited

U.S. PATENT DOCUMENTS

| 11,232,097 | B1 | 1/2022 | Antao | |
|---|---|---|---|---|
| 2014/0344557 | A1 | 11/2014 | Bartlow et al. | |
| 2015/0370554 | A1* | 12/2015 | Benedict | G06F 8/70 717/101 |
| 2018/0239898 | A1* | 8/2018 | Haerterich | G06F 21/577 |
| 2020/0257597 | A1 | 8/2020 | Kolesnik et al. | |
| 2021/0042216 | A1* | 2/2021 | Magnezi | G06F 8/658 |
| 2021/0182031 | A1* | 6/2021 | Ye | G06F 8/34 |
| 2022/0391311 | A1* | 12/2022 | Zhang | G06F 8/70 |
| 2023/0058237 | A1* | 2/2023 | Munjal | G06F 11/07 |
| 2023/0205676 | A1* | 6/2023 | Freeman | G06F 11/368 717/124 |

* cited by examiner

*Primary Examiner* — Jason D Mitchell
(74) *Attorney, Agent, or Firm* — Schmeiser, Olsen & Watts, LLP

(57) ABSTRACT

A computer-implemented method, system and computer program product for verifying a plurality of commits includes the steps: providing the plurality of commits and the master codebase as input data set; combining the plurality of commits and the master codebase into a temporary codebase; performing a plurality of integration tests on the basis of the temporary codebase; releasing and providing the temporary codebase as an adapted master codebase if successful; if at least one integration test fails: generating a plurality of clusters and continuing with method steps; sorting the plurality of clusters on the basis of a ranking criterion; for each cluster of the sorted plurality of clusters: combining the plurality of commits; performing the plurality of integration tests; releasing and providing the temporary codebase; rejecting the selected cluster and repeating; and. repeating using a different clustering criterion.

8 Claims, 4 Drawing Sheets

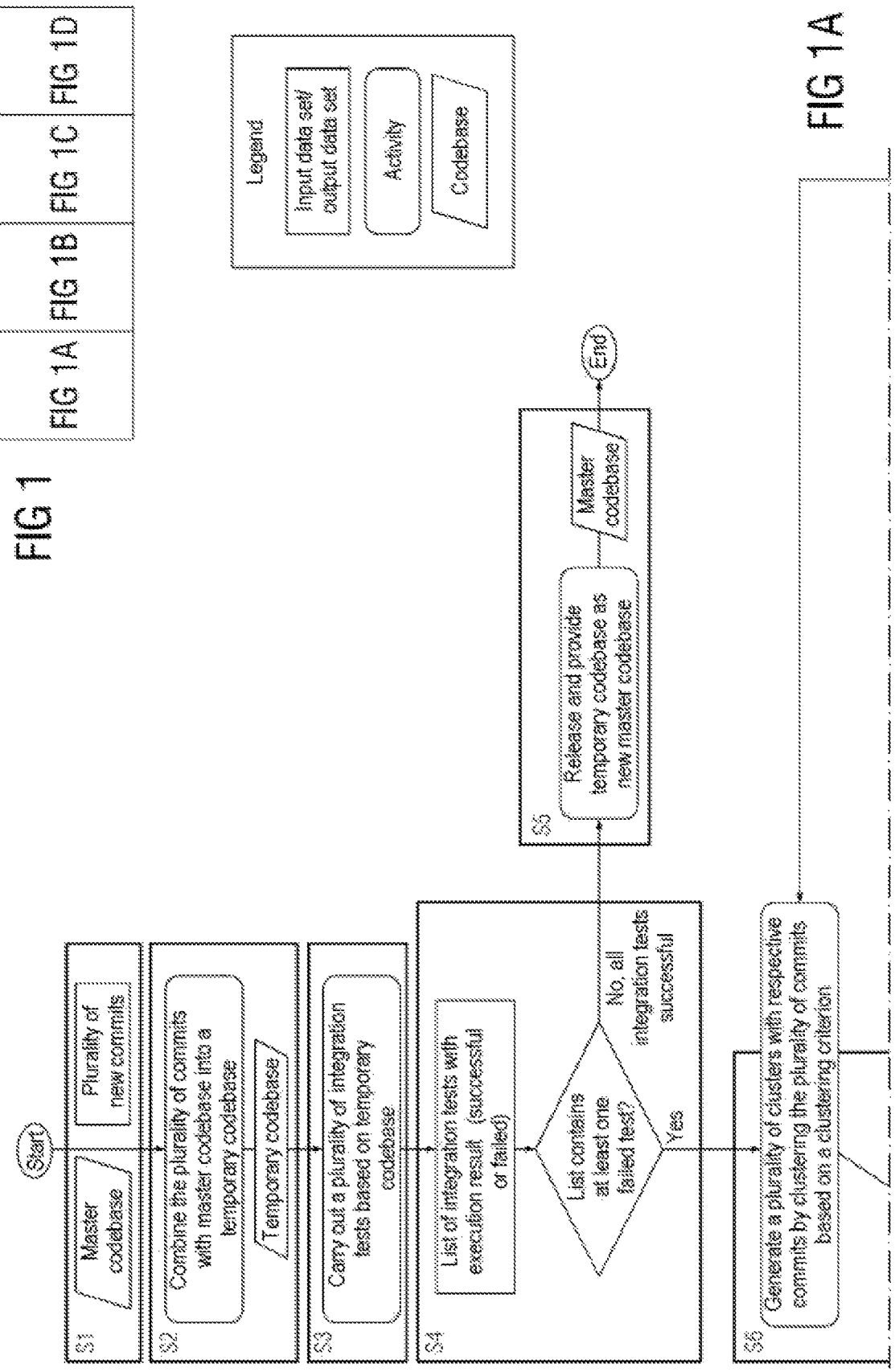

COMPUTER-IMPLEMENTED METHOD FOR VERIFYING A PLURALITY OF COMMITS

CROSS-REFERENCE TO RELATED APPLICATIONS

This application claims priority to EP Application No. 22156541.9, having a filing date of Feb. 14, 2022, the entire contents of which are hereby incorporated by reference.

FIELD OF TECHNOLOGY

The following relates to a computer-implemented method for verifying a plurality of commits. The following additionally relates to a corresponding technical system and computer program product.

BACKGROUND

Digitalization is taking on increasing importance. The advancing digitalization makes software development ("Dev") necessary in many fields. A large number of developers are typically necessary for and participate in the development of software.

Continuous integration for improving the quality of software is of central importance in software development. This usually comprises the phases commit, build, test and deploy.

The fundamental idea is to provide a shared codebase into which the developers continuously integrate their changes. The shared codebase can also be referred to as source code of the software. The software developers generate independent contributions such as changes of the code for this codebase. These contributions are integrated into the shared codebase during the integration. These contributions are conventionally referred to as commits. In other words, the commits are thus states or versions of software portions. The individual commits must therefore be combined into an application or software. After integration, a build and test cycle is automatically started.

The complexity of the software and the associated software project is usually very high. Furthermore, many developers are generally working on changes at the same time. Thereby a large number of commits and corresponding tests are necessary. This generally leads to long build and test run times.

This is disadvantageous, however, because a large number of commits accumulate between two build runs, generally several hundred commits per build and test run. The accumulated commits are not integrated until the next build and test run.

Furthermore, the commits generally influence one another because they have not yet been integrated and therefore not tested in interaction either. This increases the probability that the tests fail after integration. The commits therefore continue to accumulate because it is uncertain which commit has caused the errors from its interaction. This is particularly problematic for software projects with short release cycles.

Known approaches reduce the number of commits and/or tests. The disadvantages with the reduced number of commits are, among others, that developers combine many changes into "large" commits, that a "development pause" is necessary to work off the congestion, as well as a long time to market and a reduced innovation power. The disadvantages with the reduced number of tests or even complete omission of tests are that errors go unrecognized, the quality of the software consequently decreases and the users of the software are dissatisfied.

Software development plays a crucial role in industry 4.0 for example. In an industry 4.0 factory, intelligent machines independently coordinate production processes; for example service robots support people in the assembly for difficult work. Industry 4.0 determines the entire life cycle of a product: from idea to development, production, use and maintenance all the way to recycling.

Embodiments of the present invention therefore addresses the technical problem of providing a more reliable and more efficient computer-implemented method for verifying a plurality of commits.

SUMMARY

The above-mentioned problem is solved according to embodiments of the invention by a computer-implemented method for verifying a plurality of commits, comprising the steps:

a. providing the plurality of commits and the master codebase as input data set;
b. combining the plurality of commits and the master codebase into a temporary codebase;
c. performing a plurality of integration tests on the basis of the temporary codebase;
d. releasing and providing the temporary codebase as an adapted master codebase if all the integration tests of the plurality of integration tests are successful;
e. if at least one integration test of the plurality of integration tests fails: generating a plurality of clusters having respective commits by clustering the plurality of commits on the basis of a clustering criterion and continuing with method steps f. and g.;
f. sorting the plurality of clusters on the basis of a ranking criterion into a sorted plurality of clusters, wherein the clusters of the sorted plurality of clusters have an order with a first cluster and a last cluster;
g. for each cluster of the sorted plurality of clusters, including the last cluster, in the order from the first cluster to the last cluster:
  combining the plurality of commits of the selected cluster and the master codebase into a temporary codebase;
  performing the plurality of integration tests on the basis of the temporary codebase;
  releasing and providing the temporary codebase as an adapted master codebase if all the integration tests of the plurality of integration tests are successful;
  rejecting the selected cluster and repeating step g. with the next cluster from the sorted plurality of clusters; and
h. repeating from step e. with the plurality of commits from at least one rejected cluster and the adapted master codebase as input data set, using a different clustering criterion.

Embodiments of the invention are accordingly directed to a computer-implemented method for verifying a plurality of commits. In other words, the commits are checked as to whether they can be released or must be rejected.

To this end, the input data set in the form of the commits is provided in a first method step. The input data set can be received via one or more input interfaces of a computing unit for example. The input data set can be stored in a volatile or nonvolatile storage unit and/or received from this storage unit. Examples of storage units are a configuration management system, a database and a cloud.

The term commit can be interpreted in the conventional sense, i.e. as contributions such as modifications of a code, modified code, individual code or a code contribution of a developer. The commits can comprise additional information or data such as metadata. Examples of metadata are time information such as a timestamp, which gives an indication of the time when the change was made. Further metadata can be information regarding the developer of the code or the programming language, etc.

The provided commits are combined in an immediately following method step into a temporary codebase. The temporary codebase thus comprises the combination of individual commits with the master codebase. The master codebase can be designed as a released product version. The temporary codebase can be designed as a master having a selected or defined plurality of integrated commits.

Integration tests, typically several hundred tests, are performed on the temporary codebase. A performance test is an example of an integration test. The integration test is used to determine whether the combination or the interaction of the individual commits is functional in the temporary codebase. In other words, it is ascertained whether or not the temporary codebase is executable and can be used in the field in accordance with requirements and without malfunctions. The tests can determine for example whether different or separate hardware components or software components, such as USB devices and printers or client and server devices are functional when interacting.

Integration tests are either successful (do not fail) or not successful (fail). If an integration test fails then the interaction of the individual commits does not work. If an integration test is successful, the interaction works.

The performance of the plurality of integration tests on the basis of the temporary codebase can yield as an interim result a list with the integration tests performed and a statement or indication as to whether the integration test is successful or fails. In other words, if at least one integration test fails there is at least one bad commit.

In the optimum case all integration tests are successful and thus not a single integration test fails. In this case the temporary codebase is released directly as an adapted master codebase and made available. The temporary codebase is consequently the new master codebase. No further method steps are required.

If one or more integration tests fail, however, further method steps are required and are carried out:

First the commits are clustered. The clustering results in clusters having commits and therefore also in a specific number of clusters. Furthermore, the resulting clusters are ranked, i.e. sorted and brought into a sequence having a first cluster (cluster 1), a second cluster (cluster 2), . . . and a final cluster (cluster N) in the order 1 to N.

Each cluster and the commits within the cluster are again tested in the order of the sequence. Method step g. is repeated for each cluster. It is important that, with each cluster from the sorted plurality of clusters, the master codebase is always expanded when combined, specifically by an additional cluster and the corresponding commits from the cluster, in detail as follows:

The master codebase is initially expanded by the first cluster 1, resulting in the temporary codebase expanded by the first cluster 1. If execution of the integration tests is successful, the temporary codebase becomes the adapted master codebase. In the event of an unsuccessful execution of the integration tests, the master codebase remains unchanged.

The master codebase is then expanded by the second cluster 2, resulting in the temporary codebase expanded by the second cluster 2, etc.

The temporary codebase expanded by the final cluster N thus comprises the combination of all preceding clusters N−1 and the final cluster N itself for which all integration tests were executed successfully.

In the processing of the rejected clusters in step h., a different clustering criterion is used in the new clustering in method step e.

Embodiments of the present invention thus subdivides the commits into good and bad commits, and the good commits that all pass the integration tests are directly released and therefore do not accumulate. In contrast to the conventional art, the number of commits is considerably reduced, particularly between the builds. A disadvantageous backlog of commits is thus prevented and the build and test run times are reduced overall. The tests continue to be performed in the form of integration tests, whereby the trustworthiness and security of the commits is guaranteed and not endangered.

In one design, the at least one integration test is performed during a build.

In one design, the clustering criterion is a criterion selected from the group consisting of: a number of changes in the code, a code structure and metadata of the commit.

In one design, the ranking criterion is a customer requirement or a customer benefit.

Embodiments of the invention further relate to a technical system. The method according to embodiments of the invention is accordingly carried out by a technical system. The technical system can have one or more subunits such as computing units.

For example, one or more method steps can be carried out on a computing unit. Other method steps can be carried out on the same or on a different computing unit. Furthermore, the technical system can also comprise storage units, etc. Examples of technical systems are robot units, control units, autonomous vehicles and other computing units.

Embodiments of the invention further relates to a computer program product (non-transitory computer readable storage medium having instructions, which when executed by a processor, perform actions) comprising a computer program that has means for carrying out the method described above when the computer program is executed on a program-controlled device.

A computer program product, such as a computer program means, for example, may be provided or delivered, for example, as a storage medium, such as a memory card, USB stick, CD-ROM, DVD, for example, or else in the form of a file downloadable from a server in a network. This may take place, for example, in a wireless communication network through the transmission of an appropriate file comprising the computer program product or the computer program means. In particular, a control device such as an industry control PC or a programmable logic controller, in short PLC, or a microprocessor for a smartcard or the like can be considered as a program-controlled device.

BRIEF DESCRIPTION

Some of the embodiments will be described in detail, with reference to the following FIGS., wherein like designations denote like members, wherein:

FIG. 1 shows a schematic representation of a flowchart of the computer-implemented method according to one embodiment of the invention;

FIG. 1A shows a portion of the flowchart of the computer-implemented method according to one embodiment of the invention;

DETAILED DESCRIPTION

Embodiments of the present invention will be described below in relation to the FIGS.

Figure 1B:
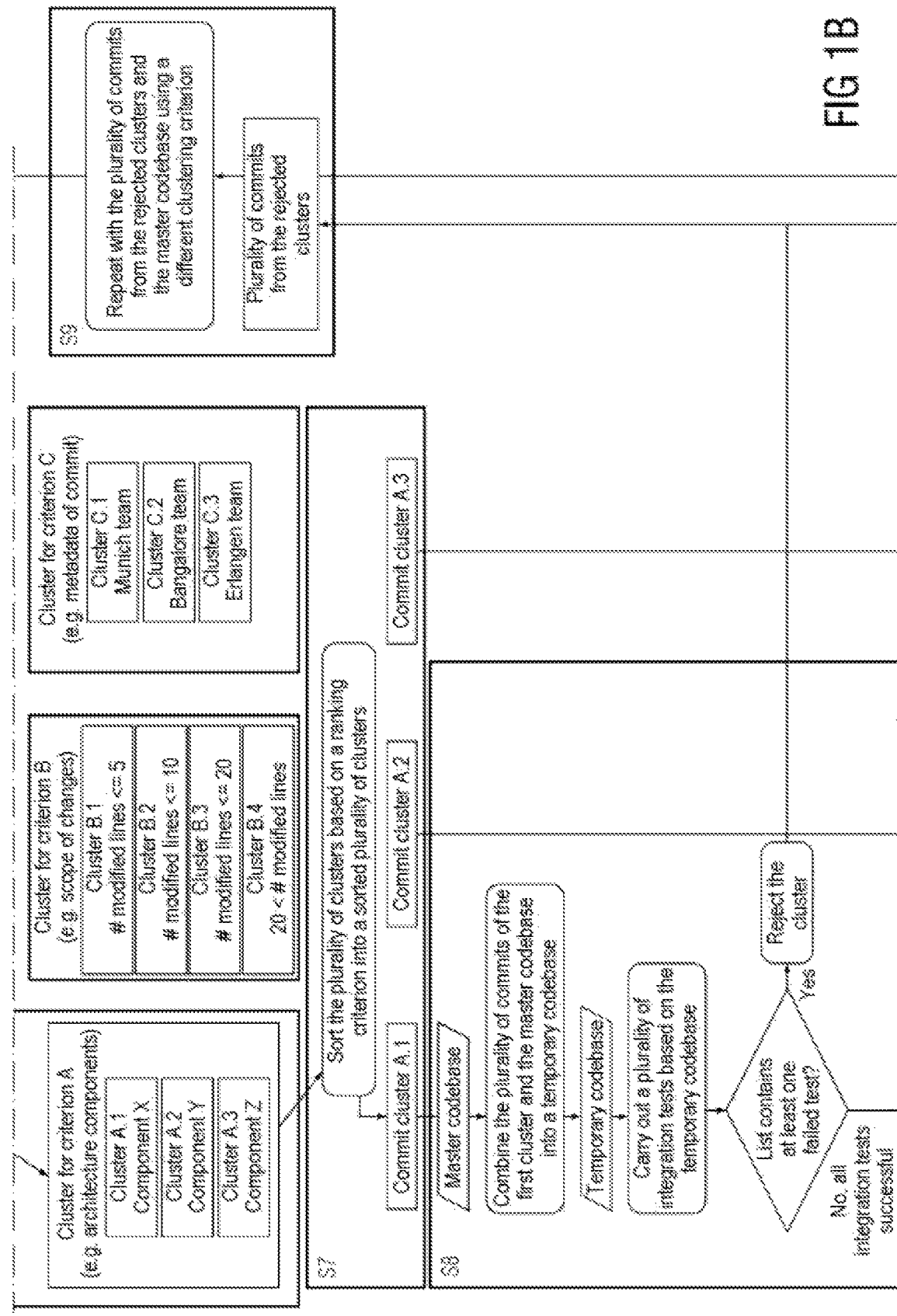
FIG. 1B shows a portion of the flowchart of the computer-implemented method according to one embodiment of the invention.
Figure 1C:
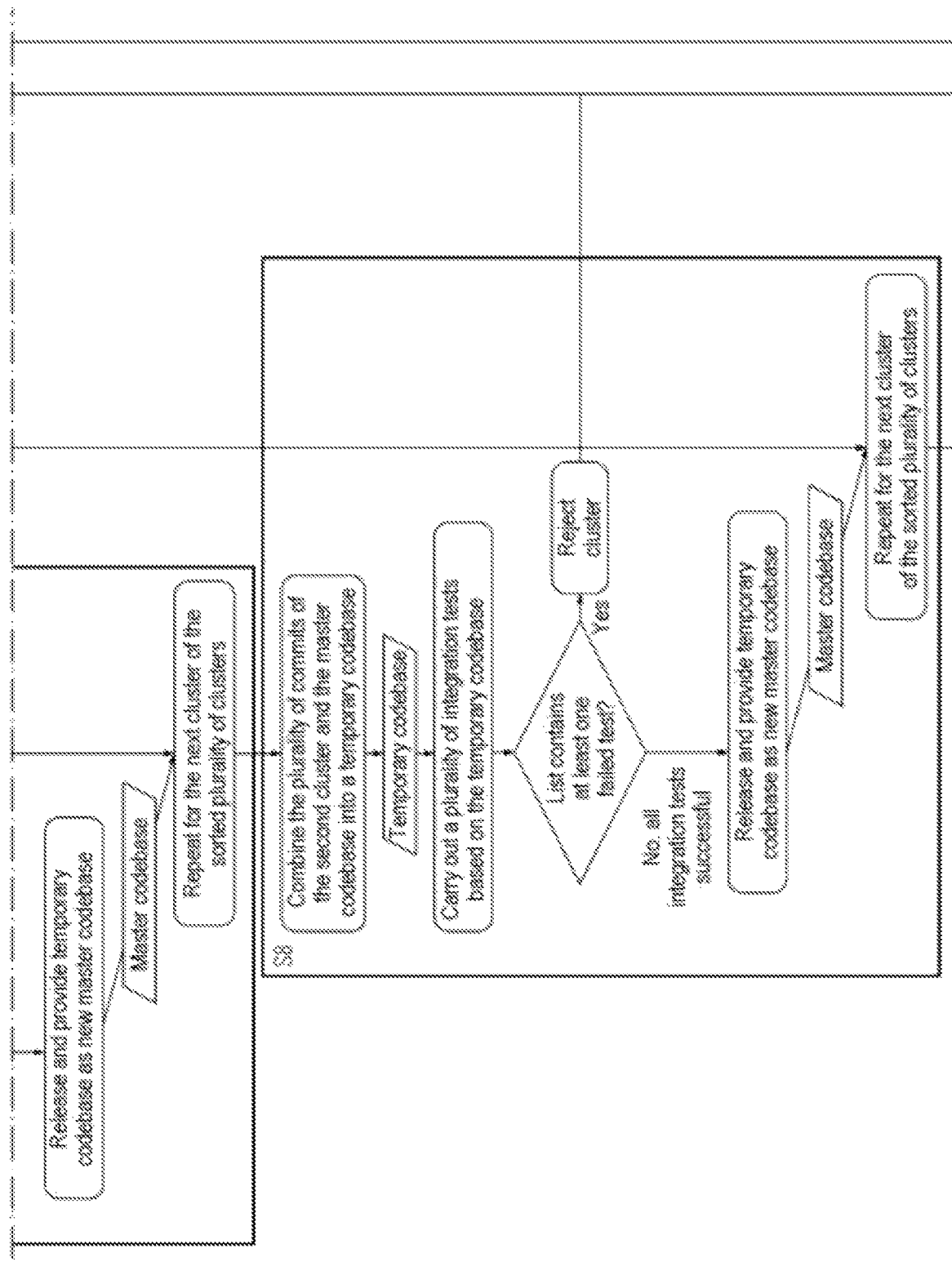
FIG. 1C shows a portion of the flowchart of the computer-implemented method according to one embodiment of the invention.
Figure 1D:
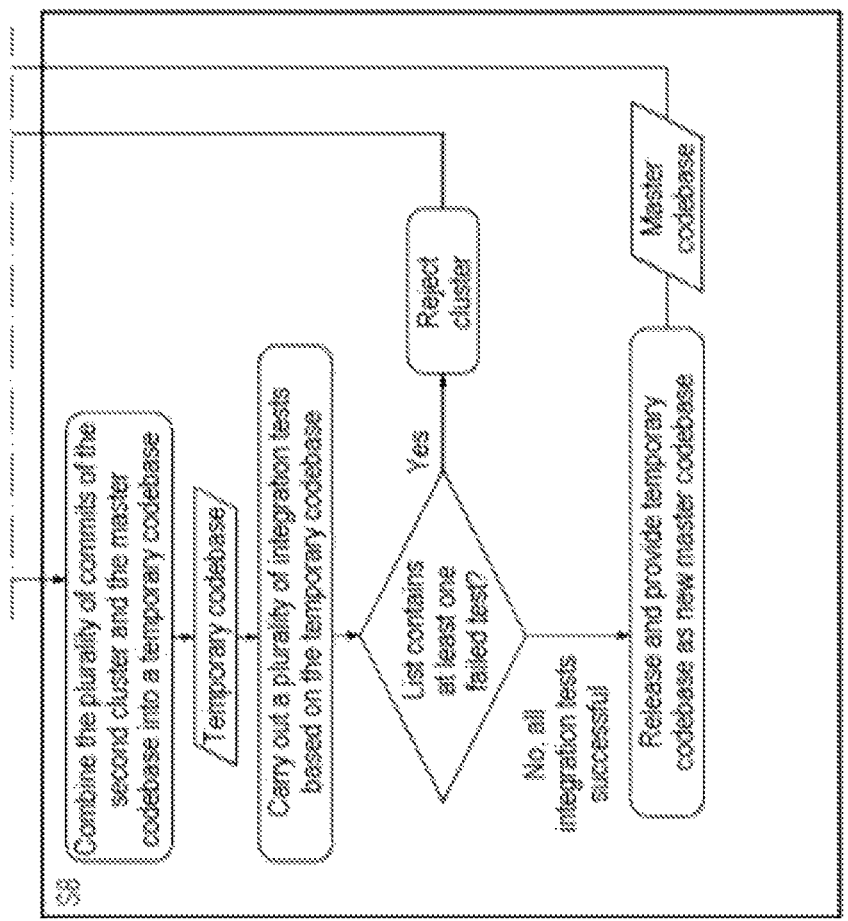
FIG. 1D shows a portion of the flowchart of the computer-implemented method according to one embodiment of the invention.

FIG. 1 shows a schematic representation of the computer-implemented method according to one embodiment of the invention.

Development teams perform a large number of changes on an existing master codebase and provide their changes in the form of numerous commits in the configuration management system.

The build system integrates the provided commits with the master codebase to form a temporary codebase.

To ensure quality, a large number of integration tests are carried out against the temporary codebase.

The results of the integration tests are checked for success (successful test) or failure (failed test).

If all integration tests are successful, the temporary codebase becomes the adapted master codebase. The adapted master codebase can be released to customers in this case.

If at least one integration test has failed:

There is a list of criteria on the basis of which the commits can be subdivided into clusters. Examples of cluster criteria are architecture components, number of modified lines in a commit, metadata for the commit etc. One of these cluster criteria is selected and the commits are clustered accordingly, for example on the basis of the architecture components, into "component X", "component Y" and "component Z". The temporary codebase from step is rejected in this case.

The clusters are sorted according to a selected ranking criterion (e.g. importance of the component for the customer) (for example "cluster A.1" before "cluster A.2" before "cluster A.3").

Beginning with the most important cluster ("cluster A.1" in the example), the commits of this cluster are integrated with the master codebase into a temporary codebase. All integration tests are carried out against this temporary codebase and the results are checked. If at least one integration test fails, the commits of the cluster are rejected. In this case the temporary codebase is rejected and the master codebase remains unchanged. If, on the other hand, all the integration tests are successful, the temporary codebase becomes the adapted master codebase and can be released to customers. This step is repeated in the order of the sorting for all further clusters.

For the rejected commits, the process is repeated with the next cluster criterion if required (e.g. in case of many rejected commits).

Example Applications

Application Case 1:
Context: Software for grid control (energy distribution), e.g. monitoring, analysis and avoidance of power failures, planning of changes to the system configuration
Input: large number of commits (software changes)
Output: identification of commits that can be integrated without error
Action: making release decisions for new product versions
Benefit: better decision basis for releasability, with more options (e.g. delayed release with all commits replaceable by immediate release with only the error-free commits)

Application Case 2:
Context: software for engineering in industrial automation, e.g. programming of controllers and control panels, hardware configuration
Input: large number of commits (software changes)
Output: small number of rejected commits
Action: troubleshooting before release of new product versions
Benefit: shorter troubleshooting times because few commits have to be considered (instead of the entire set of the large number of all commits)

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for verifying a plurality of commits, comprising the steps:
   a) providing the plurality of commits and the master codebase as input data set;
   b) combining the plurality of commits and the master codebase into a temporary codebase;
   c) performing a plurality of integration tests on the basis of the temporary codebase;
   d) releasing and providing the temporary codebase as an adapted master codebase if all the integration tests of the plurality of integration tests are successful;
   e) if at least one integration test of the plurality of integration tests fails: generating a plurality of clusters having respective commits by clustering the plurality of commits on the basis of a clustering criterion, wherein at least one cluster includes a plurality of respective commits, and continuing with method steps f) and g);
   f) sorting the plurality of clusters on the basis of a ranking criterion into a sorted plurality of clusters, wherein the clusters of the sorted plurality of clusters have an order with a first cluster and a last cluster;
   g) for each cluster of the sorted plurality of clusters, including the last cluster, in the order from the first cluster to the last cluster:
   combining the plurality of respective commits of the selected cluster and the master codebase into a temporary codebase;
   performing the plurality of integration tests on the basis of the temporary codebase;
   releasing and providing the temporary codebase as an adapted master codebase if all the integration tests of the plurality of integration tests are successful;
   rejecting the selected cluster and repeating step g) with the next cluster from the sorted plurality of clusters if at least one integration test of the plurality of integration tests fails; and
   h) repeating from step e) with the plurality of respective commits from at least one rejected cluster and the adapted master codebase as input data set, using a different clustering criterion.

2. The computer-implemented method as claimed in claim 1, wherein the at least one integration test is performed during a build.

3. The computer-implemented method as claimed in claim 1, wherein the clustering criterion is a criterion selected from the group consisting of:
a number of changes in the code and a code structure.

4. The computer-implemented method as claimed in claim 1, wherein the ranking criterion is a customer requirement or a customer benefit.

5. The computer-implemented method as claimed in claim 1, wherein the clustering criterion is metadata of the commit, wherein metadata includes a timestamp of when a change was made, a developer, and/or a programming language.

6. A technical system comprising:
at least one computing unit comprising a processor configured for performing the computer-implemented method as claimed in claim 1.

7. A computer program product, comprising a computer readable hardware storage device having computer readable program code stored therein, said program code executable by a processor of a computer system to implement a method for carrying out the method as claimed in claim 1 when the computer program is executed on a program-controlled device.

8. A computer-implemented method for verifying a plurality of commits, comprising the steps:
a) providing the plurality of commits and the master codebase as input data set;
b) combining the plurality of commits and the master codebase into a temporary codebase;
c) performing a plurality of integration tests on the basis of the temporary codebase;
d) releasing and providing the temporary codebase as an adapted master codebase if all the integration tests of the plurality of integration tests are successful;
e) if at least one integration test of the plurality of integration tests fails: generating a plurality of clusters having respective commits by clustering the plurality of commits on the basis of a clustering criterion, wherein the clustering criterion is a criterion selected from the group consisting of: a number of changes in the code, a code structure, and metadata of the commit, wherein metadata of the commit includes a timestamp of when a change was made, a developer, and/or a programming language, wherein at least one cluster includes a plurality of respective commits, and continuing with method steps f) and g);
f) sorting the plurality of clusters on the basis of a ranking criterion into a sorted plurality of clusters, wherein the clusters of the sorted plurality of clusters have an order with a first cluster and a last cluster;
g) for each cluster of the sorted plurality of clusters, including the last cluster, in the order from the first cluster to the last cluster:
combining the plurality of respective commits of the selected cluster and the master codebase into a temporary codebase;
performing the plurality of integration tests on the basis of the temporary codebase;
releasing and providing the temporary codebase as an adapted master codebase if all the integration tests of the plurality of integration tests are successful;
rejecting the selected cluster and repeating step g) with the next cluster from the sorted plurality of clusters if at least one integration test of the plurality of integration tests fails; and
h) repeating from step e) with the plurality of respective commits from at least one rejected cluster and the adapted master codebase as input data set, using a different clustering criterion.

\* \* \* \* \*